United States Patent
Onuki (10) Patent No.: US 7,427,142 B2
(45) Date of Patent: Sep. 23, 2008

(54) VEHICLE OUTSIDE MIRROR

(75) Inventor: Hiroyasu Onuki, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 313 days.

(21) Appl. No.: 11/159,414

(22) Filed: Jun. 23, 2005

(65) Prior Publication Data

US 2006/0001989 A1 Jan. 5, 2006

(30) Foreign Application Priority Data

Jun. 24, 2004 (JP) .............................. 2004-186528

(51) Int. Cl.
- *G02B 5/08* (2006.01)
- *G02B 7/182* (2006.01)
- *B60R 1/06* (2006.01)

(52) U.S. Cl. ...................... 359/841; 359/877
(58) Field of Classification Search ................. 359/841, 359/872, 877
See application file for complete search history.

(56) References Cited

U.S. PATENT DOCUMENTS

| | | | | |
|---|---|---|---|---|
| 4,696,555 A | * | 9/1987 | Enomoto | 359/874 |
| 4,915,493 A | * | 4/1990 | Fisher et al. | 359/874 |
| 5,305,144 A | * | 4/1994 | Mori et al. | 359/507 |
| 5,436,769 A | * | 7/1995 | Gilbert et al. | 359/874 |
| 5,579,178 A | * | 11/1996 | Mochizuki | 359/841 |
| 5,594,590 A | * | 1/1997 | Ishiyama | 359/841 |
| 5,724,200 A | * | 3/1998 | Mochizuki | 359/877 |
| 5,781,354 A | * | 7/1998 | Sakata | 359/841 |
| 5,986,364 A | * | 11/1999 | Bingle et al. | 310/51 |
| 6,257,731 B1 | | 7/2001 | Oh | |
| 6,533,425 B1 | | 3/2003 | Schillegger et al. | |
| 6,793,358 B2 | * | 9/2004 | Sakata | 359/872 |
| 6,811,270 B2 | * | 11/2004 | Yoshida | 359/841 |
| 6,866,392 B2 | * | 3/2005 | Hayashi | 359/841 |
| 7,104,660 B2 | * | 9/2006 | Sakata et al. | 359/841 |
| 2004/0007067 A1 | | 1/2004 | Meyer et al. | |

FOREIGN PATENT DOCUMENTS

| | | |
|---|---|---|
| EP | 1 369 301 A1 | 12/2003 |
| EP | 1 419 934 A1 | 5/2004 |
| JP | 06-027336 U | 4/1994 |
| JP | 07-004171 U | 1/1995 |
| JP | 08-108799 A | 4/1996 |
| JP | 09-142212 A | 6/1997 |
| JP | 11-011234 A | 1/1999 |
| JP | 2000-219085 A | 8/2000 |

\* cited by examiner

*Primary Examiner*—Ricky D Shafer
(74) *Attorney, Agent, or Firm*—Foley & Lardner LLP (57) ABSTRACT

A vehicle outside mirror includes a drive unit that generates a driving force, a plate that holds the drive unit, a drive gear that transmits the driving force from the drive unit, a gearcase having a housing for the drive gear, a fixing unit that fixes the plate and the gearcase in an integrated manner, and a lubricant blocking structure formed between the housing and the fixing unit.

6 Claims, 8 Drawing Sheets

VEHICLE OUTSIDE MIRROR

CROSS-REFERENCE TO RELATED APPLICATIONS

The present document incorporates by reference the entire contents of Japanese priority document, 2004-186528 filed in Japan on Jun. 24, 2004.

BACKGROUND OF THE INVENTION

1. Field of the Invention

The present invention relates to a vehicle outside mirror, and, more particularly, to a vehicle outside mirror that can realize reliable fixing of parts.

2. Description of the Related Art

Conventional vehicle outside mirrors have a mirror body which can be retracted backward from a restored state (the state at the time of using the vehicle outside mirror) and kept in that state in order to reduce protrusion to the outside, at the time of parking the vehicle equipped with the vehicle outside mirror. In some of the conventional vehicle outside mirrors, the mirror can be electrically retracted by operating an operation switch provided inside the vehicle for improving the convenience.

This type of vehicle outside mirror is described in, for example, Japanese Utility Model Application Laid-Open No. H6-27336. In this vehicle outside mirror, a motor that can be optionally activated by a switch mechanism is fixed to a plate, and the plate is fixed to a unit bracket. A housing is provided in the unit bracket, and various kinds of drive gears and the like are housed therein. A part of the drive gears is fixed to a shaft, and the shaft is fixed to the vehicle via a mirror base. By operating the operation switch provided in the interior of the vehicle equipped with the vehicle outside mirror, the motor is activated via the switch mechanism, and the various kinds of drive gears and the like transmit the power of the motor, to rotate the mirror body about a central axis of the shaft. As a result, retracting or restoring of the mirror body can be performed electrically.

However, the plate is fixed to the unit bracket by screws serving as fixing unit, and grease is applied to the drive gears in the housing of the unit bracket, as a lubricant for smoothly transmitting the driving force. Since the drive gears rotate at the time of retracting or restoring of the vehicle outside mirror, the grease is splashed due to the rotation, and may leak out of the housing and infiltrate into between the plate and the unit bracket. Since the plate is fixed to the unit bracket by the screw, when the grease infiltrated into between the plate and the unit bracket reaches the screw, the screw may become loose due to the grease.

SUMMARY OF THE INVENTION

It is an object of the present invention to at least solve the problems in the conventional technology.

A vehicle outside mirror according to one aspect of the present invention includes a drive unit that generates a driving force, a plate that holds the drive unit, a drive gear that transmits the driving force from the drive unit, a gearcase having a housing for the drive gear, a fixing unit that fixes the plate and the gearcase in an integrated manner, and a lubricant blocking structure formed between the housing and the fixing unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a vehicle outside mirror according to the present invention will be explained in detail below with reference to the accompanying drawings. The present invention is not limited by the embodiments. Constituents of the embodiments may include those that can be easily replaced by persons skilled in the art, or those that are substantially similar. In the explanation below, the front, back, upward, and downward of a vehicle equipped with the vehicle outside mirror of the present invention indicate also the front, back, upward, and downward of the vehicle outside mirror. There are various forms of the vehicle outside mirror of the present invention, but a door mirror fixed to a vehicle door will be explained as an embodiment of the present invention.

Figure 1:
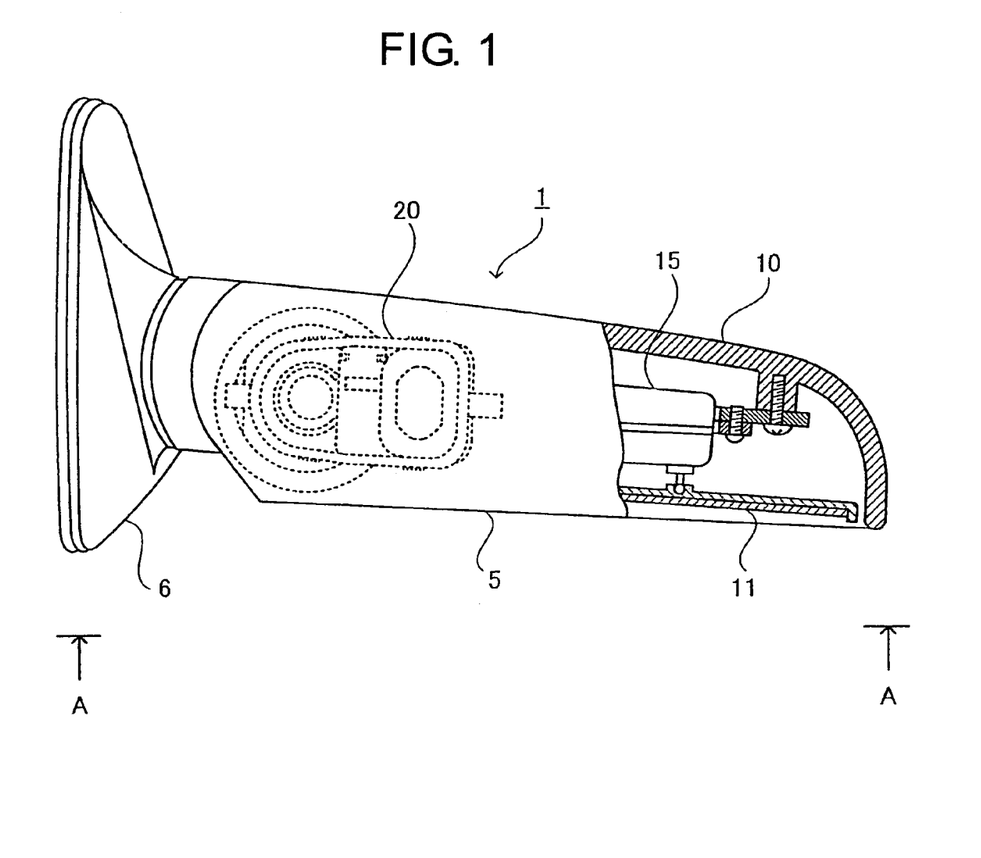
FIG. 1 is a schematic for illustrating a vehicle outside mirror according to an embodiment of the present invention.
Figure 2:
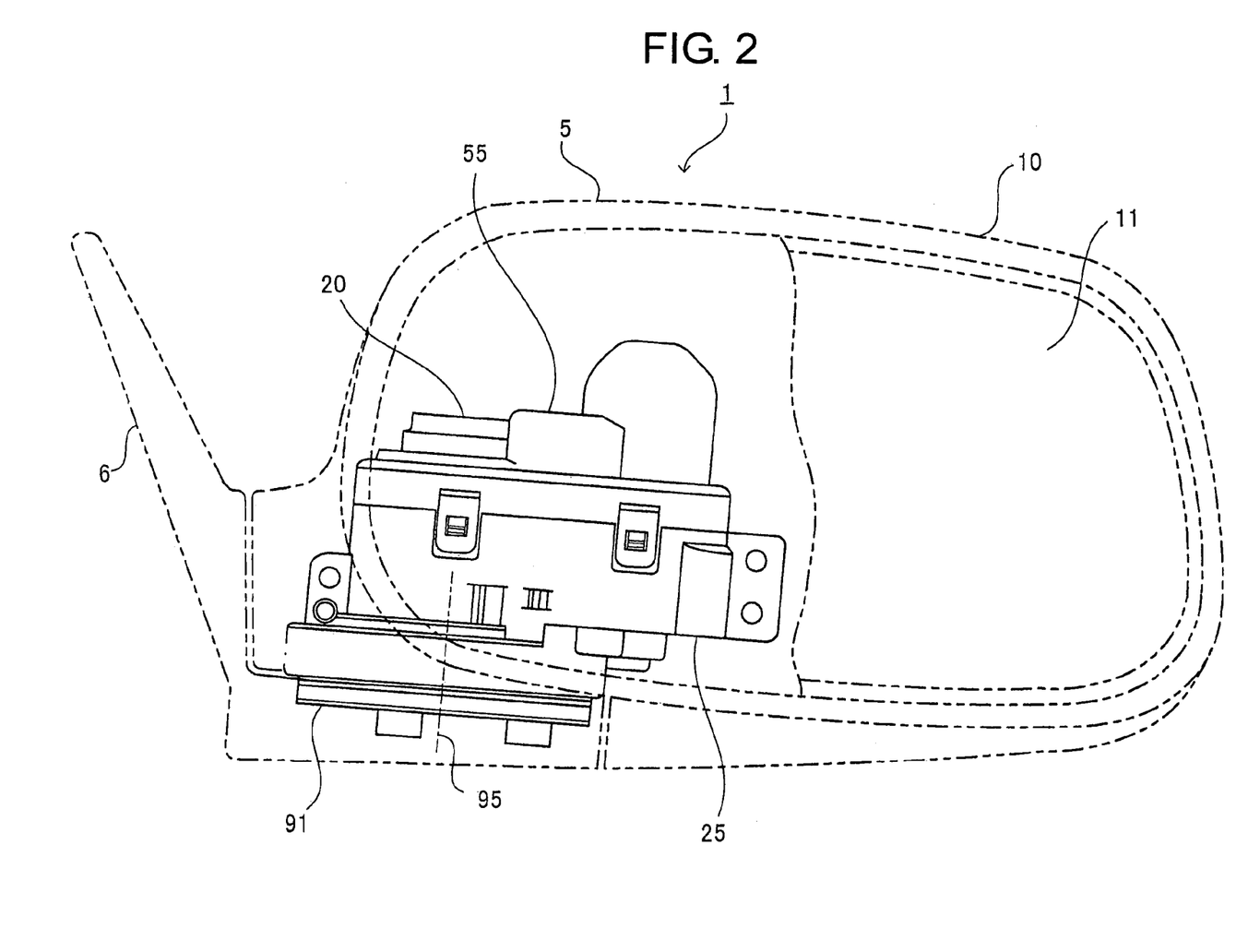
FIG. 2 is a cross section of the vehicle outside mirror according to the present embodiment, viewed in the direction of arrow A-A shown in FIG. 1.

FIG. 1 is a schematic for illustrating a vehicle outside mirror according to the present embodiment. FIG. 2 is a cross section of the vehicle outside mirror according to the present embodiment, viewed in the direction of arrow A-A shown in FIG. 1. A door mirror 1 which is an example of the vehicle outside mirror shown in FIG. 1 includes a mirror base 6 fixed to a vehicle door (not shown), and a mirror body 5 rotatable with respect to the mirror base 6. The mirror body 5 includes a mirror housing 10 and a mirror 11, and the mirror housing 10 includes a retracting drive unit 20 and a power unit 15. The mirror body 5 is rotatably provided, centering on a central axis 95 of a shaft 90, explained later, by the retracting drive unit 20. The power unit 15 is fixed to the mirror housing 10. The mirror 11 is fitted to the power unit 15, and provided such that the direction of the mirror 11 can be changed with respect to the mirror housing 10 by activating the power unit 15.

Figure 3:
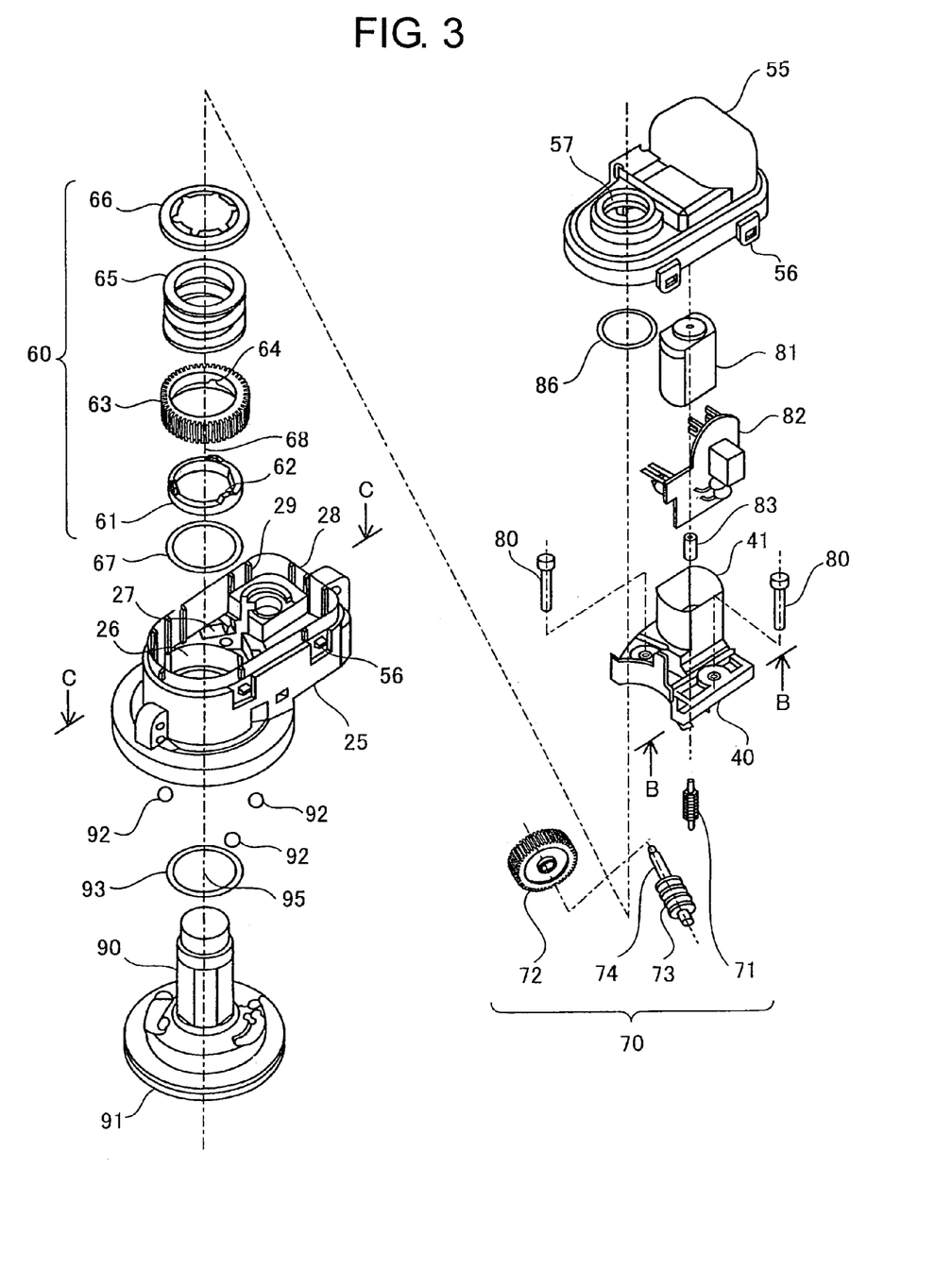
FIG. 3 is an exploded perspective view of a retracting drive unit.

FIG. 3 is an exploded perspective view of the retracting drive unit. A shaft holder 91 having the shaft 90 in a standing posture is fixed to the mirror base 6. The retracting drive unit 20 is pivotally supported on the shaft 90 so as to be able to rotate via balls 92 and a washer 93. The retracting drive unit 20 includes a gearcase 25, a plate 40, and a cover 55. The gearcase 25 and the cover 55 can be formed as one unit by allowing corresponding engagement portions 56 to engage with each other. The plate 40 is arranged in a space formed by the integrally formed gearcase 25 and cover 55, and fixed to the gearcase 25 by screws 80 serving as fixing unit. A clutch mechanism 60, a deceleration mechanism 70, a motor 81, and a switch circuit board 82 are respectively arranged in the space formed by the gearcase 25 and the cover 55.

The gearcase 25 is formed of a resin material such as polyamide glass fiber (PAG), and a housing 26 for the clutch mechanism 60 and a housing 27 for the deceleration mechanism 70 are provided in parallel in the gearcase 25. The housing 26 for the clutch mechanism 60 and the housing 27 for the deceleration mechanism 70 have a shape recessed downward. The clutch mechanism 60 is arranged in the housing 26, and the deceleration mechanism 70 is arranged in the housing 27. An insertion hole (not shown) for the shaft 90 is formed at the bottom of the housing 26 for the clutch mechanism 60, and the shaft 90 is inserted into the insertion hole. The clutch mechanism 60 is fitted to the shaft 90 via a washer 67. A peripheral wall 28 is formed in the gearcase 25, and a plurality of ribs 29 are provided on the inner surface of the peripheral wall 28.

The plate 40 is formed of a resin material softer than the material forming the gearcase 25, such as polyacetal (POM). The plate 40 is fitted to the inside of the peripheral wall 28 or the inside of the rib 29, and also fixed to the gearcase 25 by the screws 80. A motor holder 41 is provided on the plate 40. The motor holder 41 is formed in a shape of a standing wall along the outer shape of the motor 81, and the motor 81, which is a drive unit, is enclosed by the motor holder 41 and held in a state with an output axis thereof (not shown) being directed downward. The motor 81 is fixed to the switch circuit board 82, which is fixed to the plate 40. An insertion hole (not shown) for the output axis of the motor 81 is formed at the bottom of the motor holder 41. The output axis of the motor 81 is inserted into the insertion hole and coupled to a first worm gear 71 of the deceleration mechanism 70 via a joint 83.

The clutch mechanism 60 includes a clutch holder 61, a clutch gear 63, a spring 65, and a push nut 66. The clutch mechanism 60 is formed by sequentially fitting the washer 67, the clutch holder 61, the clutch gear 63, and the spring 65 to the shaft 90 inserted in the housing 26 for the clutch mechanism 60, and pressing the spring 65 by the push nut 66. At this time, a protrusion 62 formed on the upper surface of the clutch holder 61 engages with a recess 64 formed on the inner surface of the clutch gear 63. The clutch gear 63 is formed as a part of the drive gears. A central axis 68 of the clutch gear 63 and the central axis 95 of the shaft 90 substantially agree with each other.

The deceleration mechanism 70 has a plurality of gears, and the gears are formed as the drive gears. The deceleration mechanism 70 formed of the gears includes the first worm gear 71, a helical gear 72 engaging with the first worm gear 71, and a second worm gear 73 connected to the helical gear 72 by a rotation shaft 74. The second worm gear 73 of the deceleration mechanism 70 is arranged so as to engage with the clutch gear 63 of the clutch mechanism 60.

A pivotal support portion 57, which is a circular hole, is formed in the cover 55, and the shaft 90 is inserted into the pivotal support portion 57 so as to engage the cover 55 with the gearcase 25, after having assembled the respective parts formed as described above. At this time, the shaft 90 is inserted into the pivotal support portion 57 via an O-ring 86 between the shaft 90 and the cover 55.

Figure 4:
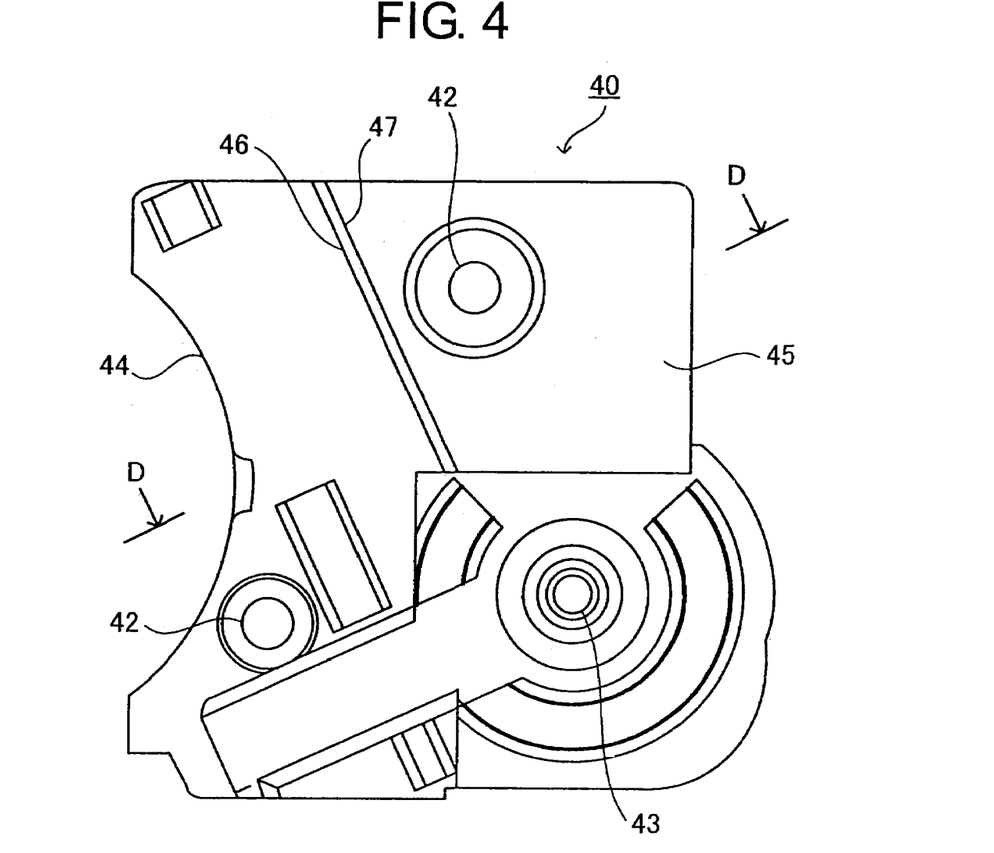
FIG. 4 is a cross-section along a line B-B shown in FIG. 3.
Figure 5:
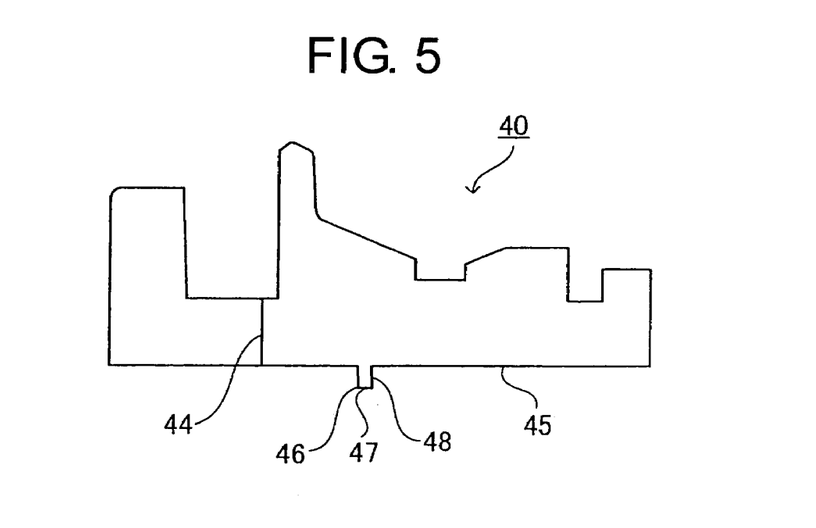
FIG. 5 is a cross-section along a line D-D shown in FIG. 4.

FIG. 4 is a cross-section along a line B-B shown in FIG. 3. FIG. 5 is a cross-section along a line D-D shown in FIG. 4. The plate 40 includes two screw insertion holes 42, which are holes for inserting the screw 80, and an output axis insertion hole 43 for inserting the output axis of the motor 81. A roll off 44 is formed in the plate 40, at a place where the clutch mechanism 60 is positioned at the time of assembling the retracting drive unit 20. The roll off 44 is formed in a circular arc shape, being a part of a circular shape, described later, which is the shape of the housing 26 for the clutch mechanism 60 formed in the gearcase 25. A rib 46 is formed between one of the two screw insertion holes 42 and the roll off 44. The rib 46 is formed on a clamp face 45 of the plate 40, which faces the gearcase 25 and is fitted to the gearcase 25. Further, the rib 46 is formed in a plate shape protruding downward from the clamp face 45 so as to cut off between the screw insertion hole 42 and the roll off 44. That is, the rib 46 is formed, with a point 47 thereof located downward.

Figure 6:
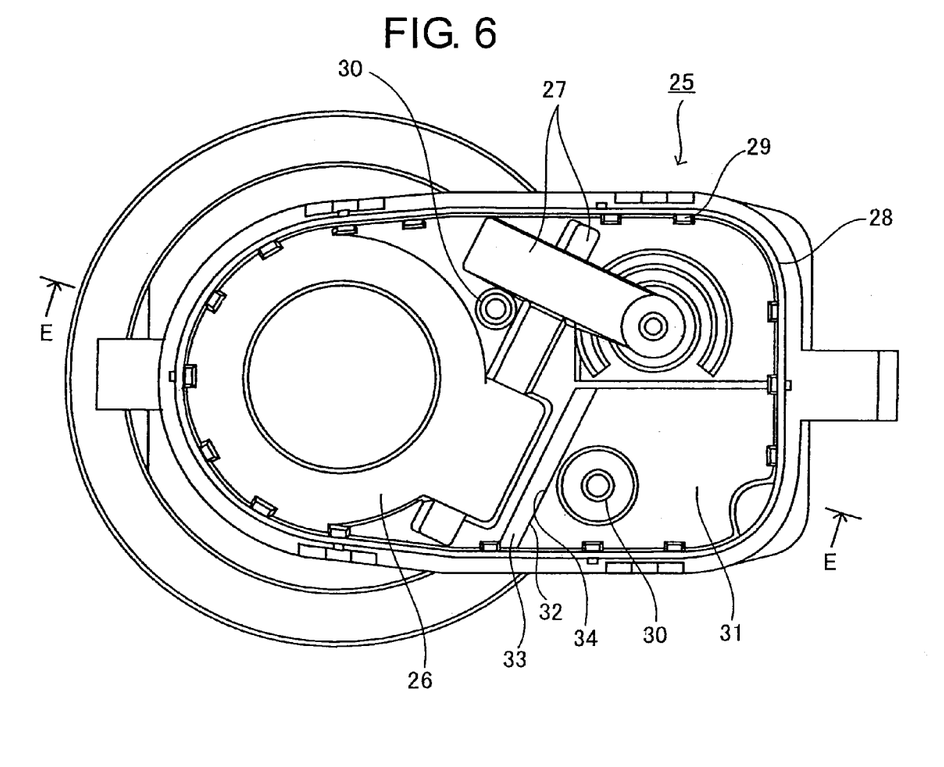
FIG. 6 is a cross-section along a line C-C shown in FIG. 3.
Figure 7:
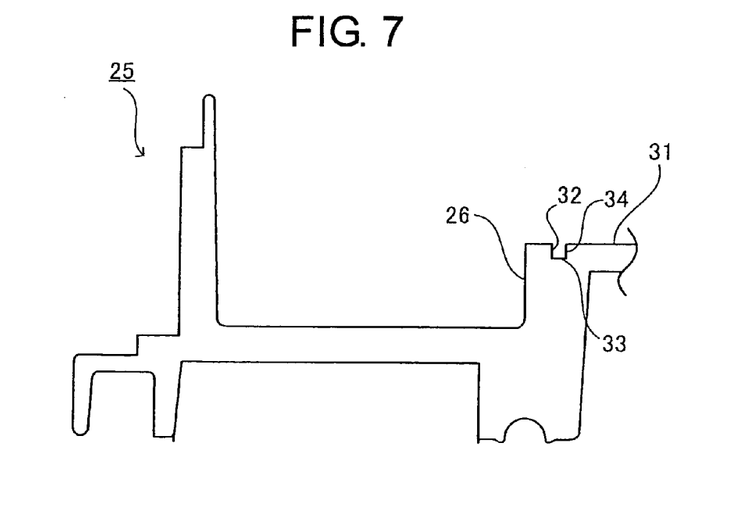
FIG. 7 is a cross-section along a line E-E shown in FIG. 6.

FIG. 6 is a cross-section along a line C-C shown in FIG. 3. FIG. 7 is a cross-section along a line E-E shown in FIG. 6. Two screw holes 30, into which the screw is threaded, are formed in the gearcase 25. The screw holes 30 are formed at positions corresponding to the two screw insertion holes 42 in the plate 40. The screw holes 30 are formed on a clamp face 31 of the gearcase 25 facing the plate 40, to which the plate 40 is fitted. The gearcase 25 includes the housing 26 for the clutch mechanism 60 and the housing 27 for the deceleration mechanism 70, and the housing 26 for the clutch mechanism 60 is formed in a shape for housing the clutch mechanism 60 and the second worm gear 73. The housing 26 for the clutch mechanism 60 has a circular shape in most part as seen from above, so that the clutch gear 63 of the clutch mechanism 60 can be housed therein, and a substantially rectangular shape partly, so that the second worm gear 73 can be housed therein. The housing 27 for the deceleration mechanism 70 has a shape such that a substantially rectangular shape for housing the helical gear 72 and a substantially rectangular shape for housing the rotation axis 74 of the second worm gear 73 are combined, as seen from above, so that the helical gear 72 of the deceleration mechanism 70 and the rotation axis 74 of the second worm gear 73 can be housed therein.

A groove 32 is formed between one of the two screw holes 30, corresponding to the screw insertion hole 42, which is cut off from the roll off 44 by the rib 46 of the plate 40, and the housing 26 for the clutch mechanism 60. The groove 32 is formed, with a groove bottom 33 being positioned downward, between the screw hole 30 and the housing 26 on the clamp face 31 of the gearcase 25, at a position corresponding to the rib 46 of the plate 40. The width of the groove 32 is wider than the width of the rib 46, that is, wider than the thickness of a plate forming the rib 46, and the depth of the groove 32 is larger than the height of the rib 46, that is larger than the distance from the clamp face 45 of the plate 40 to the point 47 of the rib 46.

Figure 8:
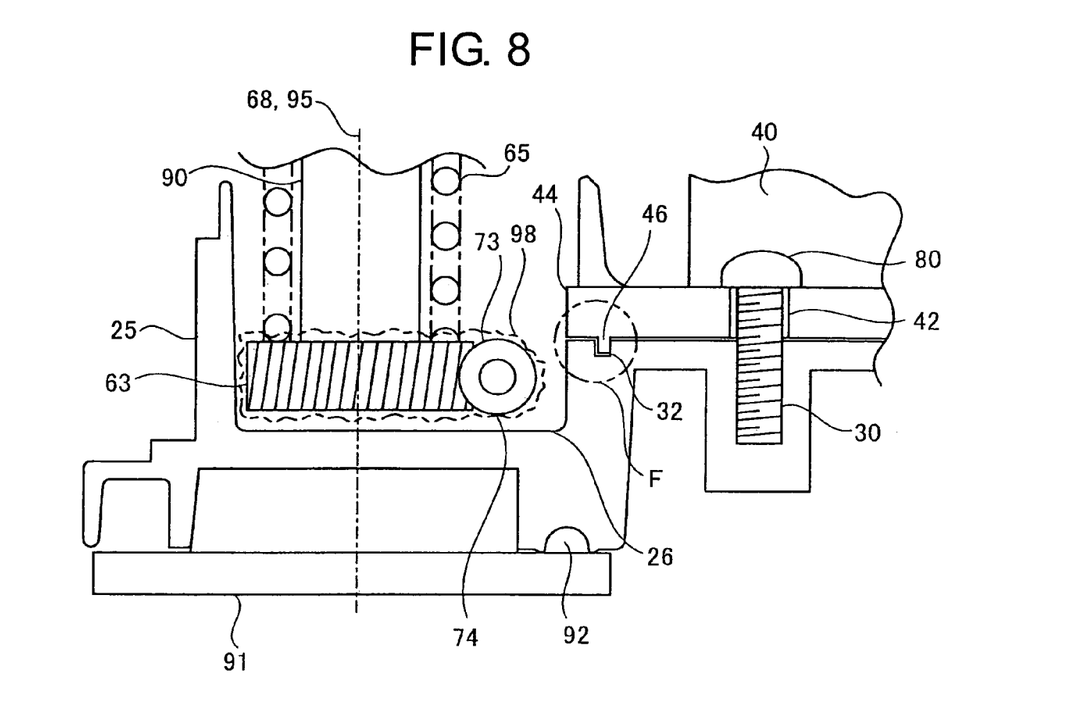
FIG. 8 is a detailed view of a relevant part, depicting a state in which a plate is fixed to a gearcase.
Figure 9:
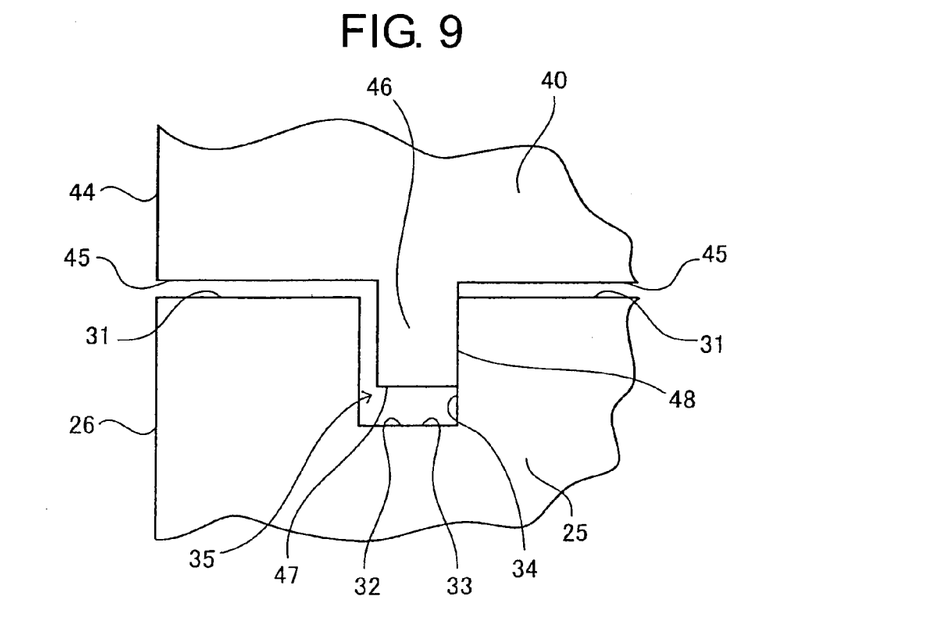
FIG. 9 is a detailed view of part F shown in FIG. 8.
Figure 11:
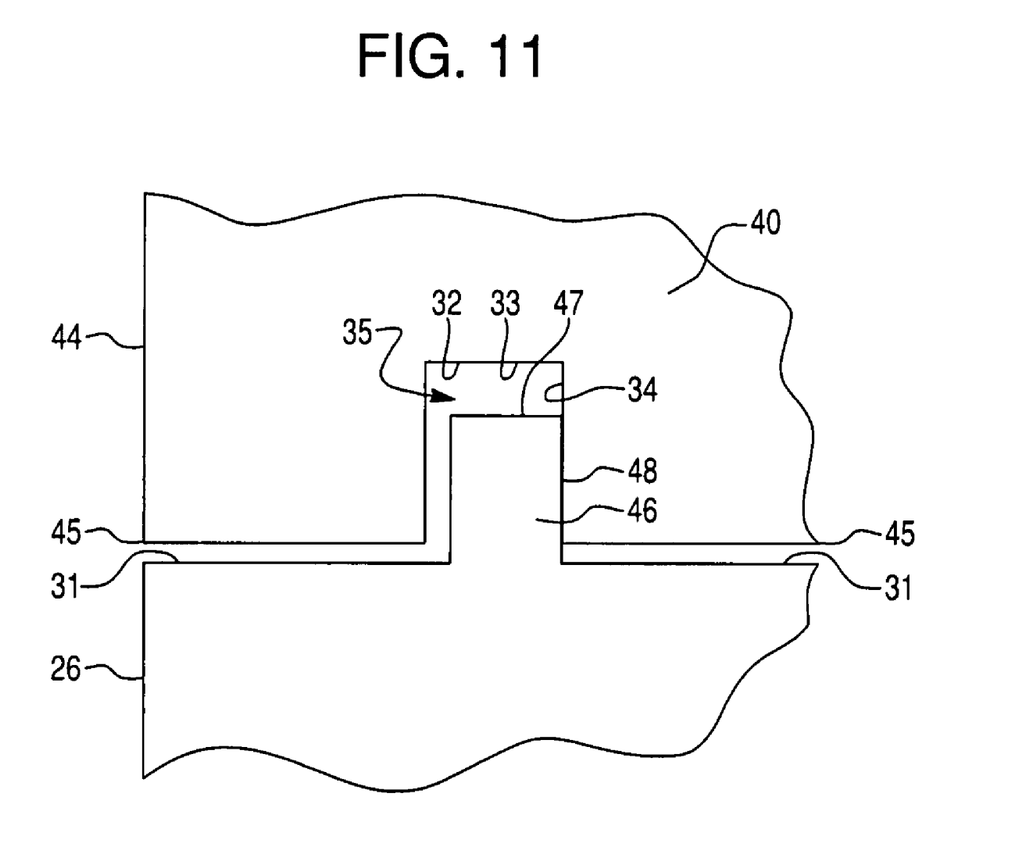
FIG. 11 is a detailed view showing an alternative embodiment to that of FIG. 9.

FIG. 8 is a detailed view of a relevant part, depicting a state in which a plate is fixed to the gearcase and the clutch mechanism is assembled. FIG. 9 is a detailed view of part F shown in FIG. 8. FIG. 11 shows an alternative embodiment to that of FIG. 9 where the plate 40 has the groove 32 and the gearcase housing 26 has the rib 46. The door mirror 1 according to the embodiment is configured as described above, and the assembly of the door mirror 1 will be explained below. At the time of assembling the door mirror 1, grease 98 is applied as a lubricant to the respective gears, that is, the first worm gear 71, the helical gear 72, the second worm gear 73, and the clutch gear 63. The grease 98 is also applied to the protrusion 62 of the clutch holder 61 and the recess 64 of the clutch gear 63, which is a sliding part of the clutch mechanism 60. When the plate 40 having the rib 46 formed thereon is fixed by the screws 80 to the gearcase 25 having the groove 32 formed therein, the rib 46 enters into the groove 32 from above and is fixed thereto.

In the state in which the plate 40 is fixed to the gearcase 25, with the clamp face 45 of the plate 40 and the clamp face 31 of the gearcase 25 facing each other, the rib 46 of the plate 40 enters into the groove 32 in the gearcase 25. At this time, since the rib wall 48 of the rib 46 positioned on the screw insertion hole 42 side and the groove wall 34 of the groove 32 positioned on the screw hole 30 side are brought into contact with each other, and the material of the plate 40 having the rib 46 formed thereon is softer than the material of the gearcase 25, the rib 46 is bent and pressed against the groove wall 34. Since the depth of the groove 32 is larger than the height of the rib 46, the point 47 of the rib 46 is away from the bottom 33 of the groove 32. That is, there is a space 35 between the point 47 of the rib 46 and the bottom 33 of the groove 32. The rib 46 and the groove 32 are formed as the lubricant blocking structure.

Figure 10:
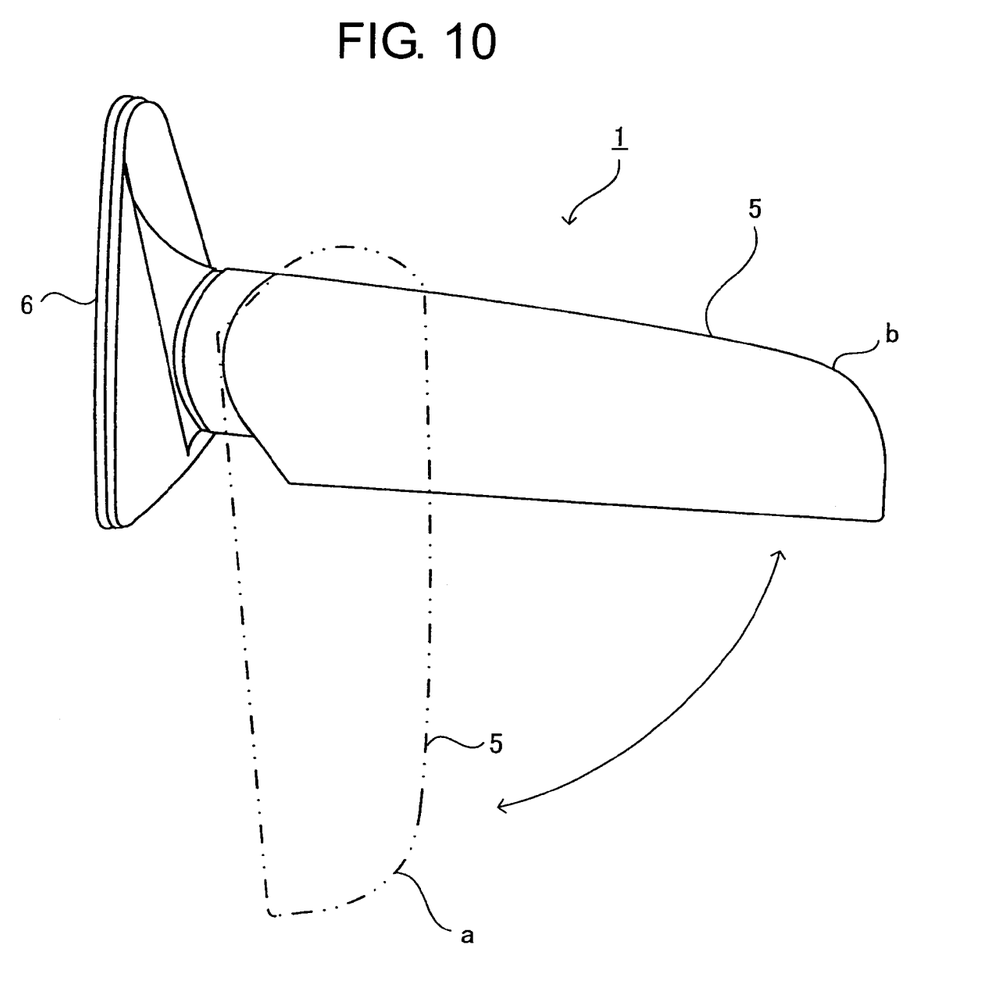
FIG. 10 is a schematic for illustrating a state of a mirror body at the time of retracting and restoring.

FIG. 10 is a schematic for illustrating a state of a mirror body at the time of retracting and restoring. When the door mirror 1 assembled as described above is retracted, the motor 81 is activated via a switch circuit (not shown) arranged on the switch circuit board 82 by operating the operation switch (not shown) provided inside the vehicle so as to retract the door mirror 1. When the motor 81 is activated to rotate the output axis of the motor 81, the first worm gear 71 rotates via the joint 83. Since the first worm gear 71 engages with the helical gear 72, the rotation of the first worm gear 71 is transmitted to the helical gear 72 to rotate the helical gear 72. The second worm gear 73 connected to the helical gear 72 is rotated by the rotation axis 74 due to the rotation of the helical gear 72.

The second worm gear 73 engages with the clutch gear 63, but the clutch gear 63 is fixed in the rotation direction with respect to the shaft 90, in the state that the recess 64 formed in the clutch gear 63 engages with the protrusion 62 formed on the clutch holder 61. In other words, the clutch gear 63 cannot rotate with respect to the shaft 90. Therefore, when the rotation of the second worm gear 73 is transmitted to the clutch gear 63, the second worm gear 73 rotates around the clutch gear 63, while engaging with the clutch gear 63. That is, the entire retracting drive unit 20 having the second worm gear 73 rotates around the clutch gear 63.

The retracting drive unit 20 is fixed to the mirror body 5, and since the central axis 68 of the clutch gear 63 approximately agrees with the central axis 95 of the shaft 90, the mirror body 5 rotates about the central axis 95 of the shaft 90, with the rotation of the retracting drive unit 20 around the clutch gear 63. As a result, the mirror body 5 retracts backward, and becomes a retracted state (FIG. 10, a). Thus, the mirror body 5 can be moved to become the retracted state by transmitting the driving force of the motor 81 by the respective drive gears provided in the deceleration mechanism 70 and the clutch mechanism 60.

To change the state of the mirror body 5 from the retracted state to the restored state, the operation switch is operated so as to raise the door mirror 1 to a standing position. As a result, the motor 81 rotates in the direction opposite to the rotation direction at the time of retracting the door mirror 1. Since the motor 81 rotates in this manner, the first worm gear 71, the helical gear 72, and the second worm gear 73 rotate in the direction opposite to the rotation direction at the time of retracting the door mirror 1. The mirror body 5 also rotates in the opposite direction, about the central axis 95 of the shaft 90. As a result, the mirror body 5 in the retracted state becomes the restored state (FIG. 10, b).

When the motor 81 is activated to move the mirror body 5 to be in the retracted state or in the restored state, the respective gears rotate according to the operation of the motor 81. At this time, since the grease 98 is applied to the respective gears, the grease 98 may be splashed due to the rotation. Particularly, when the second worm gear 73 engaging with the clutch gear 63 housed in the housing 26 for the clutch mechanism 60 rotates, the grease 98 splashed to the second worm gear 73 may infiltrate into between the clamp face 45 of the plate 40 and the clamp face 31 of the gearcase 25. The grease 98 infiltrated into between the clamp face 45 of the plate 40 and the clamp face 31 of the gearcase 25 enters into the groove 32 formed on the clamp face 31 of the gearcase 25. Since the rib 46 is located in the groove 32, when the grease 98 passes through the groove 32, the grease 98 is blocked by the rib 46, and enters into the groove 32. Since there is the space 35 between the point 47 of the rib 46 and the bottom 33 of the groove 32, the grease 98 entering into the groove 32 is accumulated in this space 35. Further, since the rib wall 48 of the rib 46 on the screw insertion hole 42 side and the groove wall 34 of the groove 32 on the screw hole 30 side are brought into contact with each other and the rib 46 is pressed against the groove wall 34, the grease 98 having infiltrated into the space 35 is blocked by the rib wall 48 and the groove wall 34, and will not travel to the clamp face 31 on the screw hole 30 side.

Since the door mirror 1 as the vehicle outside mirror includes the rib 46 and the groove 32, which form the lubricant blocking structure, between the housing 26 in which the clutch gear 63 and the second worm gear 73 are housed, and the screw insertion hole 42, and the screw hole 30, the grease 98 applied to these gears can be prevented from advancing toward the screw insertion hole 42 or the screw hole 30. In other words, even if the grease 98 is splashed due to the rotation of the second worm gear 73, which is a part of the drive gears, and infiltrates into between the clamp face 45 of the plate 40 and the clamp face 31 of the gearcase 25, the travel of the grease 98 is prevented by the rib 46 and the groove 32. Accordingly, the grease 98 is suppressed from entering into between the screw 80 and the screw hole 30. As a result, loosening of the screw 80 due to the grease 98 applied to the drive gears can be suppressed.

Since the groove 32 is provided between the housing 26 in which the second worm gear 73 is housed, and the screw 80, and the screw hole 30, and the rib 46 is made to enter into the groove 32, a linear path from the housing 26 to the screw 80 and the screw hole 30 between the clamp face 45 of the plate 40 and the clamp face 31 of the gearcase 25 can be reliably blocked. As a result, even if the grease 98 is splashed due to the rotation of the second worm gear 73, and infiltrates into between the clamp face 45 of the plate 40 and the clamp face 31 of the gearcase 25, the traveling direction of the grease 98 is blocked, and hence, the grease 98 is reliably suppressed from reaching the screw 80 and infiltrating into between the screw 80 and the screw hole 30. As a result, loosening of the screw 80 due to the grease 98 applied to the drive gears can be suppressed more reliably.

Since the groove 32 is formed on the clamp face 31 of the gearcase 25, with the groove bottom 33 located downward, the grease 98 blocked by the rib 46 can flow into the groove bottom 33. As a result, the travel of the grease 98, which has infiltrated into between the clamp face 45 of the plate 40 and the clamp face 31 of the gearcase 25, toward the screw 80 can be blocked more reliably. Accordingly, the grease 98 is more reliably suppressed from reaching the screw 80 and infiltrating into between the screw 80 and the screw hole 30, thereby more reliably suppressing the loosening of the screw 80 due to the grease 98 applied to the drive gears.

Since there is the space 35 between the point 47 of the rib 46 and the bottom 33 of the groove 32, the grease 98 having infiltrated into the groove 32 can be accumulated in this space 35. Accordingly, even when much of the grease 98 is blocked by the rib 46 and the groove 32, such a situation that the grease 98 overflows from the groove 32 can be reduced, and much more grease 98 can be blocked. Therefore, the travel of the grease 98, which has infiltrated into between the clamp face 45 of the plate 40 and the clamp face 31 of the gearcase 25, toward the screw 80 can be suppressed more reliably. As a result, the loosening of the screw 80 due to the grease 98 applied to the drive gears can be suppressed more reliably.

By providing the space 35 in this manner, the space 35 can be made open to the outside of the gearcase 25. When the space 35 is open to the outside, the grease 98 accumulated in the space 35 can be drained to the outside, and hence, much more grease 98 can be blocked by the rib 46 and the groove 32. As a result, the loosening of the screw 80 due to the grease 98 applied to the drive gears can be suppressed more reliably.

Since the rib wall 48 of the rib 46 on the screw insertion hole 42 side and the groove wall 34 of the groove 32 on the screw hole 30 side are brought into contact with each other and the rib 46 is pressed against the groove wall 34, travel of the grease 98 having infiltrated into the space 35 toward the clamp face 31 where the screw hole 30 is located can be suppressed more reliably, by the rib wall 48 and the groove wall 34. Accordingly, travel of the grease 98 toward the clamp faces 45 and 31 near the screw 80, of the clamp face 45 of the plate 40 and the clamp face 31 of the gearcase 25 can be suppressed more reliably. Accordingly, infiltration of the grease 98 into between the screw 80 and the screw hole 30 can be suppressed more reliably. As a result, the loosening of the screw 80 due to the grease 98 applied to the drive gears can be suppressed more reliably.

Since the lubricant blocking structure is formed of the rib 46 integrally formed on the clamp face 45 of the plate 40, and the groove 32 formed on the clamp face 31 of the gearcase 25, the lubricant blocking structure can be easily provided. As a result, even when the lubricant blocking structure is provided, the production cost can be suppressed, since the structure is simple. Further, when the plate 40 is fixed to the gearcase 25 by the screw 80, the lubricant blocking structure is formed by allowing the rib 46 to enter into the groove 32. Therefore, even when the lubricant blocking structure is provided, the production steps do not increase. As a result, even when the lubricant blocking structure is provided, production thereof is easy, and an increase in the production cost due to an increase in the production steps when providing the lubricant blocking structure can be suppressed. By suppressing loosening of the screw 80, rattling between parts due to the loosening of the screw 80 can be suppressed, thereby improving the quality considerably.

The rib 46 is brought into contact with the wall 34 of the groove 32, but the rib 46 may not be brought into contact with the groove wall 34. When the rib 46 is not brought into contact with the groove wall 34, the rib 46 and the groove 32 are provided between the housing 26 of the clutch mechanism 60 and the screw 80, so as to block the grease 98 from the housing 26 by the rib 46 and allow the grease 98 to drop into the groove 32. As a result, loosening of the screw 80 due to the grease 98 applied to the drive gears can be suppressed. When the rib 46 is not brought into contact with the groove wall 34, the dimensional tolerance at the time of manufacturing the rib 46 and the groove 32 can be increased, and hence, the rib 46 and the groove 32 can be provided more easily. As a result, an increase in the production cost at the time of providing the lubricant blocking structure can be suppressed more reliably.

The electrically-retracted door mirror 1 fixed to the vehicle door has been explained as an example of the vehicle outside mirror of the present invention, but the electrically-retracted vehicle outside mirror may not be fixed to the vehicle door. For example, the electrically-retracted vehicle outside mirror may be fixed to a stay, such as an electrically-retracted vehicle outside mirror for a truck. The electrically-retracted vehicle outside mirror can be fixed to any place.

Further effects and modifications will readily occur to those skilled in the art. Embodiments of the present invention are not limited to the specific embodiments explained above, and therefore, various changes can be made without departing from the spirits of the appended claims and substitutes thereof.

The vehicle outside mirror according to the present invention can suppress the loosening of the fixing unit due to the lubricant applied to the drive gears.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle outside mirror comprising:
   a drive unit that generates a driving force;
   a plate that holds the drive unit;
   a drive gear that transmits the driving force from the drive unit;
   a gearcase having a housing for the drive gear;
   a fixing unit that fixes the plate and the gearcase in an integrated manner; and
   a lubricant blocking structure formed between the housing and the fixing unit,
   wherein the lubricant blocking structure includes
      a groove formed on one of opposite surfaces of the plate and the gearcase; and
      a rib formed on other of the opposite surfaces of the plate and the gearcase, protruding from a surface on which the rib is formed and entering into the groove,
   a material of one of the other one of the plate or the gearcase where the rib is formed is softer than a material of the plate or the gearcase where the groove is formed, and
   the rib is pressed against a wall of the groove.

2. A vehicle outside mirror comprising:
   a drive unit configured to generate a driving force;
   a plate configured to hold the drive unit;
   a drive gear configured to transmit the driving force from the drive unit;
   a gearcase having a housing configured to house the drive gear;
   a fixing unit configured to fix the plate and the gearcase in an integrated manner; and
   a lubricant blocking structure formed between the housing and the fixing unit, wherein the lubricant blocking structure includes
   a groove formed on one of opposite surfaces of the plate and the gearcase; and
   a rib formed on an other of the opposite surfaces of the plate and the gearcase, protruding from a surface on which the rib is formed and configured to enter the groove,
   wherein a width of the groove is wider than a width of the rib such that the rib is not in contact with at least one wall of the groove when the plate and the gearcase are fixed in the integrated manners,
   wherein a depth of the groove is longer than a height of the rib so that there is a space between a bottom of the groove and a tip of the rib when the plate and the gear case are fixed in the integrated manner.

3. The vehicle outside mirror according to claim 2, wherein the groove is formed such that the bottom of the groove is located downward, and the rib is formed such that a tip of the rib is located downward and enters into the groove from above.

4. The vehicle outside mirror according to claim 2, wherein a wall of the rib and another wall of the groove are brought into contact with each other.

5. The vehicle outside mirror according to claim 2, wherein a wall of the rib on a side of the fixing unit and another wall of the groove on the side of the fixing unit side are brought into contact with each other.

6. The vehicle outside mirror according to claim 2, wherein the rib is integrally formed with the plate.

\* \* \* \* \*